(12) United States Patent
Yafuso

(10) Patent No.: US 8,493,645 B2
(45) Date of Patent: *Jul. 23, 2013

(54) OPTICALLY POWERED OPTICAL MODULATOR

(75) Inventor: Eiji Yafuso, Carlsbad, CA (US)

(73) Assignee: PV Labs, Inc. (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/568,263

(22) Filed: Aug. 7, 2012

(65) Prior Publication Data

US 2012/0293853 A1   Nov. 22, 2012

Related U.S. Application Data

(63) Continuation of application No. 13/020,004, filed on Feb. 2, 2011, now Pat. No. 8,254,009.

(60) Provisional application No. 61/301,521, filed on Feb. 4, 2010.

(51) Int. Cl.
*G02F 1/03* (2006.01)
*G02F 1/19* (2006.01)
*G02F 1/33* (2006.01)

(52) U.S. Cl.
USPC ............ 359/245; 359/254; 359/305; 359/315

(58) Field of Classification Search
USPC ................. 359/245, 246, 252–254, 257–259, 359/316, 322, 672, 673; 349/33, 149, 200, 349/201

See application file for complete search history.

(56) References Cited

U.S. PATENT DOCUMENTS

| 4,229,079 A * | 10/1980 | Wayne et al. ................. 359/245 |
| 5,394,257 A * | 2/1995 | Horan et al. ................. 359/107 |
| 6,288,767 B1 * | 9/2001 | Murata et al. ................ 349/200 |
| 6,359,674 B1 * | 3/2002 | Horiuchi ....................... 349/200 |
| 8,254,009 B2 | 8/2012 | Yafuso | |

* cited by examiner

*Primary Examiner* — Loha Ben
(74) *Attorney, Agent, or Firm* — Steven M. Greenberg, Esq.; Carey Rodriguez Greenberg O'Keefe, LLP

(57) ABSTRACT

An optically powered optical modulator comprises an optical modulation component, such as an electro-optical modulator, acousto-optic modulator or magneto-optic modulator, in combination with one or two lens assemblies positioned at one or both apertures of the optical modulation component, so that the optical modulator formed by the combination of the lens assembly or assemblies and the optical modulation component has optical focus power.

8 Claims, 19 Drawing Sheets

OPTICALLY POWERED OPTICAL MODULATOR

CROSS-REFERENCE TO RELATED APPLICATIONS

This application is a continuation of U.S. patent application Ser. No. 13/020,004 filed on Feb. 2, 2011, which claims priority to U.S. Provisional Patent Application No. 61/301,521 filed on Feb. 4, 2010, the teachings of each of which are hereby incorporated by reference.

FIELD OF THE INVENTION

The present invention is directed to optical imaging systems, and more particularly to electro-optical imaging systems.

BACKGROUND OF THE INVENTION

In known optical systems, such as laser systems, an electro-optical element known as a Pockels cell is used as a polarization switching component.

A Pockels cell is a component which includes a birefringent crystal across which a variable voltage is applied in order to control polarization of light passing through the crystal. Conventional Pockels cells and their manufacture are well known in the optical arts. An exemplary transverse Pockels cell assembly is shown in FIGS. 3A and 3B at reference 300, and comprises a cylindrical, anisotropic, birefringent electro-optical crystal 308 and a cylindrical housing 306 which carries the crystal 308 as well as a pair of opposed electrodes 316. The crystal 308 has an optical axis 310 and has first and second opposed optically clear apertures 312, 314 defined by the optical axis 310 (the term "aperture" being used in its optical rather than physical sense). The electrodes 316 are electrically coupled to a control system 322 and positioned to pass an electric field transversely through the crystal 308 to control modulation of incoming light aligned with the optical axis 310.

As shown in FIG. 1, in an exemplary LiDAR system 100, polarization filters (not shown) are used to allow only one linear polarization to enter the system 100. Light $L_1$ enters the system 100 from object space through an entrance pupil 102, which images that incoming light into the plane of an unpowered (in the optical rather than electrical sense) Pockels cell 104, which is used to electro-optically rotate the polarization axis of the light. The light then proceeds to a first relay lens 106 which collimates the image to a second relay lens 108, which focuses the image to a detector image plane 110. In this construction, the first relay lens 106 is difficult to design and manufacture. In particular, it can be seen that not only are the individual rays in each bundle diverging, but the bundles are also diverging from each other. Final image fidelity and contrast are highly sensitive to the aberration qualities of both the first and second relay lenses.

SUMMARY OF THE INVENTION

The present invention is directed to an optically powered optical modulator. The optically powered optical modulator comprises an optical modulation component, such as an electro-optical modulator, acousto-optic modulator or magneto-optic modulator, in combination with one or two lens assemblies, so that the combination of the lens assembly or assemblies and the optical modulation component has optical focus power, either by refractive or diffractive means.

In one aspect, the present invention is directed to an optically powered electro-optical modulator. The optically powered electro-optical modulator comprises an electro-optical cell, at least one optically powered lens assembly, and a housing. The electro-optical cell comprises at least one electro-optical element having an optical axis and first and second opposed optically clear cell apertures defined by the optical axis, and at least one pair of opposed electrodes positioned to pass an electric field through the at least one electro-optical element to control modulation of incoming light aligned with the optical axis. The at least one optically powered lens assembly comprises an optically powered first lens assembly secured at the first cell aperture, and has an optically clear first lens aperture in optical alignment with the first cell aperture. The housing carries the electro-optical cell, the electrodes and the at least one lens assembly, and the at least one lens assembly causes the electro-optical modulator to act as a field lens for incoming light whose image region is within the electro-optical modulator.

In one embodiment, the at least one electro-optical element comprises at least one anisotropic, birefringent electro-optical crystal whose crystal axes define the optical axis, and the electrodes are positioned to pass an electric field through the at least one crystal to control an amount of birefringence of the at least one crystal for incoming light aligned with the optical axis and thereby control polarization of the light.

The first lens assembly may comprise a single lens, or a plurality of individual lenses secured in optical alignment with one another.

The at least one optically powered lens assembly may further comprise an optically powered second lens assembly secured at the second cell aperture and having an optically clear second lens aperture in optical alignment with the second cell aperture and with the first lens aperture. In such an embodiment, the first lens assembly and the second lens assembly may each comprise a single lens, the first lens assembly and the second lens assembly may each comprise a plurality of individual lenses secured in optical alignment with one another, or the first lens assembly may comprise a single lens while the second lens assembly comprises a plurality of individual lenses secured in optical alignment with one another.

The electro-optical modulator may further comprise an electrical control system electrically coupled to the electrodes for controlling a voltage across the electrodes.

In one embodiment, the electro-optical cell is a Pockels cell; in another embodiment, the electro-optical cell is a Kerr cell.

In one embodiment, the at least one pair of opposed electrodes are positioned so that the electric field passes through the at least one electro-optical element transversely to the optical axis. In another embodiment, the at least one pair of opposed electrodes are positioned so that the electric field passes through the at least one electro-optical element longitudinally along the optical axis.

In another embodiment, the present invention is directed to an optically powered optical modulator. The optically powered optical modulator comprises an optical modulation component, an optically powered first lens assembly, and a housing. The optical modulation component has an optical axis and first and second opposed optically clear component apertures defined by the optical axis and is operable to modulate light aligned with the optical axis. The optically powered first lens assembly is secured at the first component aperture and has an optically clear first lens aperture in optical alignment with the first component aperture. The housing carries the optical modulation component and the first lens assembly.

In certain embodiments, the optical modulation component may be either an electro-optical component, an acousto-optical component or a magneto-optical component.

The first lens assembly may comprise a single lens, or a plurality of individual lenses secured in optical alignment with one another.

The optically powered optical modulator may further comprise an optically powered second lens assembly secured at the second cell aperture and having an optically clear second lens aperture in optical alignment with the second cell aperture and with the first lens aperture. In such an embodiment, the first lens assembly and the second lens assembly may each comprise a single lens, the first lens assembly and the second lens assembly may each comprise a plurality of individual lenses secured in optical alignment with one another, or the first lens assembly may comprise a single lens while the second lens assembly comprises a plurality of individual lenses secured in optical alignment with one another.

DESCRIPTION OF THE DRAWINGS

In order that the subject matter may be readily understood, embodiments are illustrated by way of examples in the accompanying drawings, in which.

DETAILED DESCRIPTION

Aspects of the present invention provide an optical modulator which possesses focusing power by combining an optical modulation component with one or more optically powered lens assemblies. One suitable type of optical modulation component is an electro-optical modulator, such as a Pockels cell.

Figure 1:
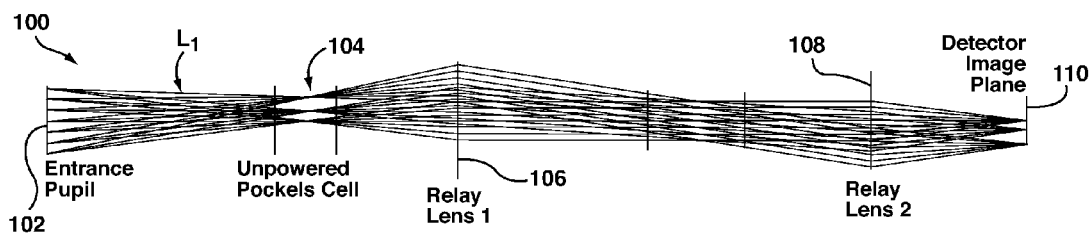
FIG. 1 is a schematic representation of a portion of a LiDAR imaging system with an unpowered Pockels cell.
Figure 3A:
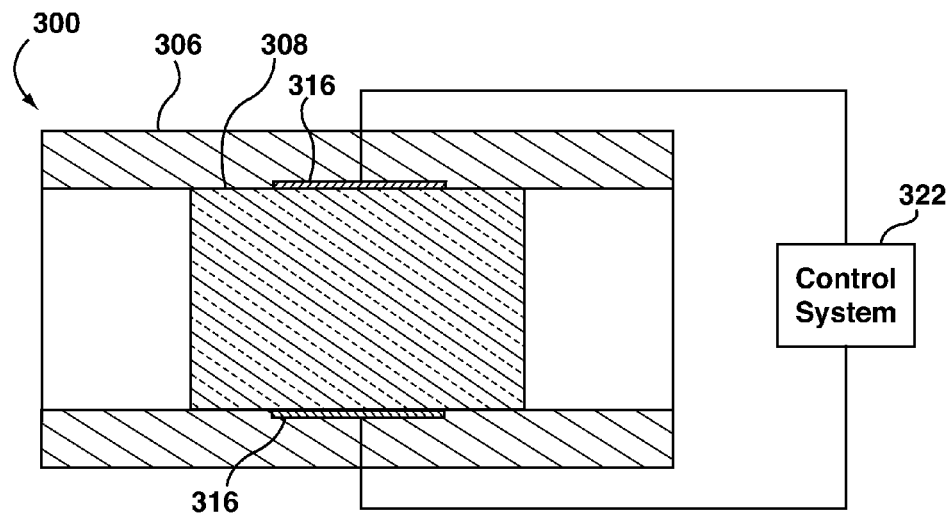
FIG. 3A is a side cross-sectional view of an exemplary Pockels cell.
Figure 3B:
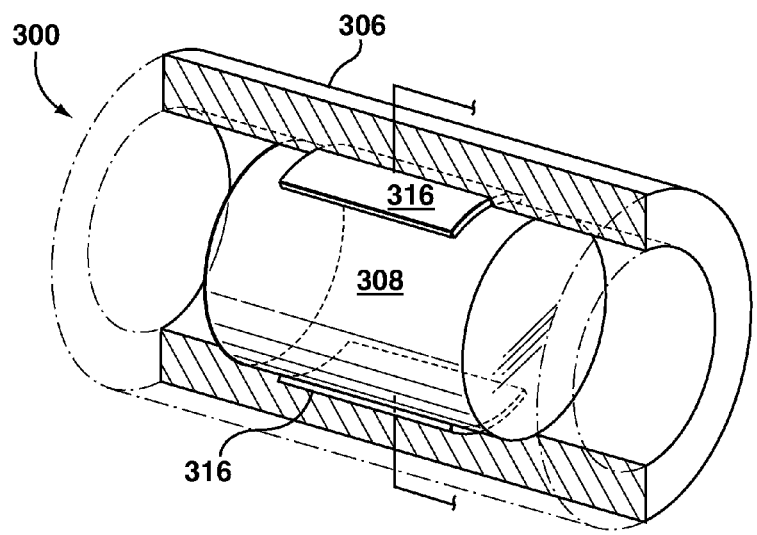
FIG. 3B is a cut-away perspective view of the Pockels cell of FIG. 3A.

A prior art Pockels cell, such as that shown in FIGS. 3A and 3B, is used in the prior art LiDAR system 100 shown in FIG. 1. As explained above, in the exemplary prior art LiDAR system 100 shown in FIG. 1, light $L_1$ having only one linear polarization enters from object space through an entrance pupil 102, which images that incoming light $L_1$ into the plane of the optically unpowered Pockels cell 104, which is used to electro-optically rotate the polarization axis of the light $L_1$, which is then collimated by the first relay lens 106 to a second relay lens 108, which focuses the light $L_1$ into an image on the image plane of a detector image plane 110 of an image detector.

An optically powered Pockels cell optical modulator according to an aspect of the present invention, in effect a "Pockels lens", can be positioned at an image, or field, plane within an optical system that images an extended angular field of view, like the system 100 shown in FIG. 1, thereby simplifying the design of that system. The use of such an optically powered Pockels cell optical modulator in a LiDAR system will now be described.

Figure 2:
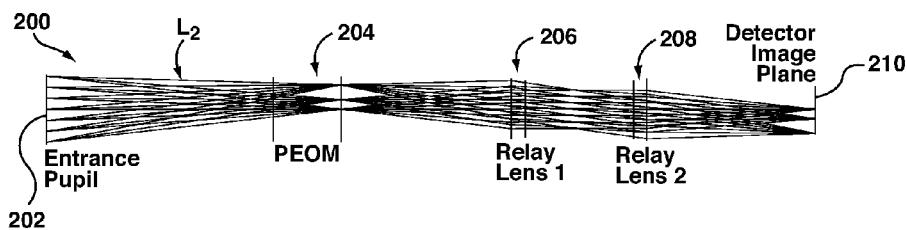
FIG. 2 is a schematic representation of a portion of a LiDAR imaging system incorporating an electro-optical modulator according to an aspect of the present invention.

An exemplary LiDAR system incorporating an optically powered electro-optical modulator according to an aspect of the present invention is shown in FIG. 2 and indicated generally by the reference numeral 200. The LiDAR system 200 includes an exemplary optically powered electro-optical modulator (PEOM) in the form of an optically powered Pockels cell optical modulator, which is denoted by the reference 204 in FIG. 2, and may is positioned at a field plane within the optical system 200. Analogously to the LiDAR system 100 of FIG. 1, in the exemplary LiDAR system 200 shown in FIG. 2, light $L_2$ enters the entrance pupil 202 and passes through the powered electro-optical modulator 204 which electro-optically rotates the polarization axis of the light $L_2$. The light $L_2$ the proceeds to a first relay lens 206, which is used to collimate the light $L_2$ such that the light $L_2$ can efficiently, and without excessive phase aberration, pass through a polarization selective element such as a beamsplitter (not shown) and a second relay lens 208 is then used to image the collimated beam bundles of light $L_2$ onto the detector image plane 210 of an image detector.

As can be seen in FIGS. 1 and 2, by replacing the optically unpowered Pockels cell 104 with an optically powered electro-optical modulator 204 according to an aspect of the present invention, the size of the subsequent optical train, i.e. the first relay lens 206, second relay lens 208 and image detection medium 210, in the LiDAR system 200 may be reduced in both diameter and length, relative to the prior art LiDAR system 100 shown in FIG. 1. Final image fidelity and contrast are highly sensitive to the aberration qualities of both the first relay lens 106, 206 and the second relay lens 108, 208. The diameter is important because the aberrations which must be addressed are generally highly and nonlinearly sensitive to aperture diameter and hence lens diameter. By enabling a reduction in the diametric size of the pupils of the relay lenses 206, 208 necessary to both collimate and refocus the bundles of light rays, the use of an optically powered electro-optical modulator 204 according to an aspect of the present invention enables the complexity of these lenses to be reduced.

In the exemplary LiDAR system 200 shown in FIG. 2, the optically powered electro-optical modulator 204 acts as a field lens for incoming light whose image region is within the electro-optical modulator. As used herein, the term "field lens" refers to a lens or set of lenses operating at the location of a relayed image to shift the pupil of the optical system and thereby limit the size of the emerging bundle of light rays. Thus, the use of the optically powered electro-optical modulator 204 according to an aspect of the present invention, as shown in the system 200 in FIG. 2, results in the diverging bundles of light rays forming a "tighter" combination of bundles than where the electro-optical element is unpowered, such as the Pockels cell 104 shown in FIG. 1.

The optics necessary to relay the light, and hence the image, from the optically powered electro-optical modulator 204 to the image detection medium 210 are thus rendered less complex by the presence of optical focus power at the plane of the optically powered electro-optical modulator 204. This may enable a corresponding reduction in the complexity of alignment and maintenance of alignment of the relay optics. Moreover, because of the position of the optical power provided by the optically powered electro-optical modulator 204, subsequent optical elements used to form the final image, such as the first relay lens 206 and second relay lens 208, are less aberration-control intensive, and therefore easier to design, fabricate and align, than for the prior art system shown in FIG. 1.

Another advantage apparent in comparing the LiDAR system shown in FIG. 2 to the prior art system shown in FIG. 1 is that the overall system length can be reduced. The system pupil is projected to the middle of the polarization-selective device, such as a beamsplitter (not shown) and because of the presence of the optically powered electro-optical modulator 204, this pupil has been projected to a plane closer to the relay optics.

Figure 4A:
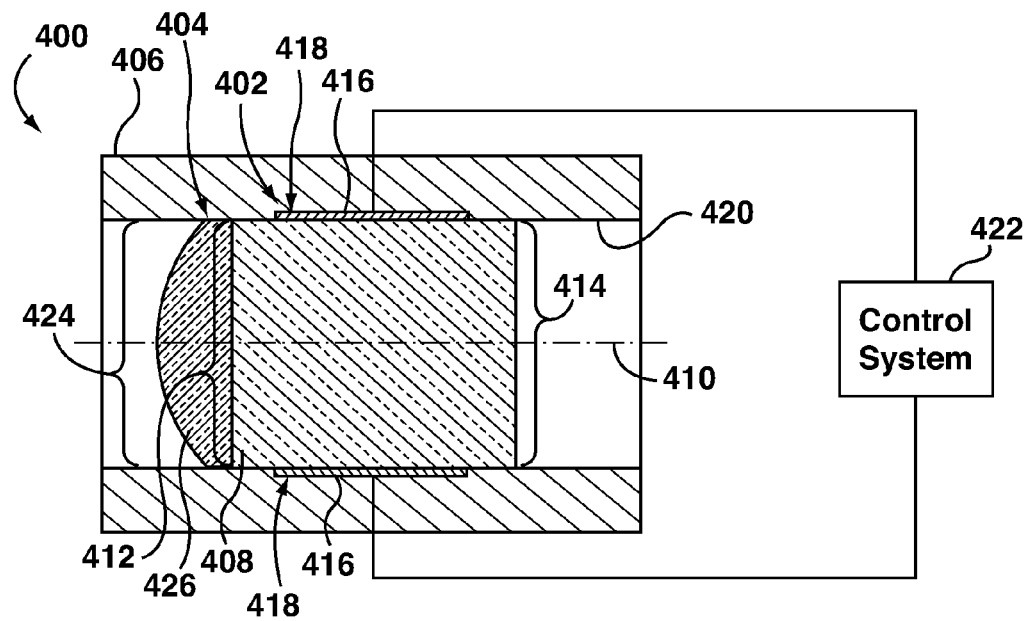
FIG. 4A is a side cross-sectional view of a first exemplary embodiment of an optically powered transverse electro-optical modulator according to an aspect of the present invention.
Figure 4B:
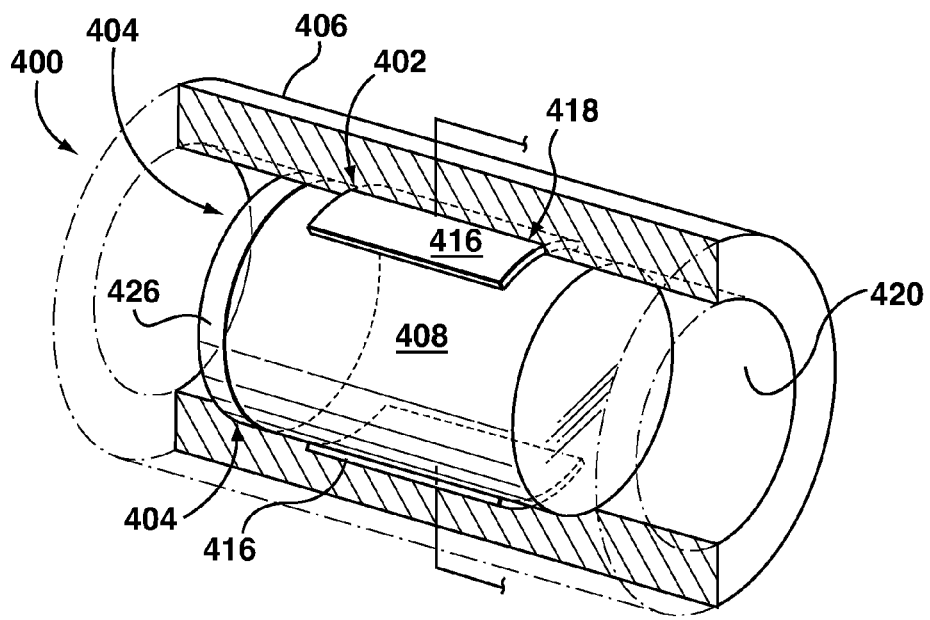
FIG. 4B is a cut-away perspective view of the electro-optical modulator of FIG. 4A.

Reference is now made to FIGS. 4A and 4B, in which a first exemplary optically powered electro-optical modulator is shown generally at 400. The optically powered electro-optical modulator 400 comprises an electro-optical cell 402, an optically powered lens assembly 404 comprising a single lens 426, and a cylindrical housing 406 which carries the electro-optical cell 402 and the lens 426.

The electro-optical cell 402 comprises a cylindrical electro-optical element 408 and a pair of electrodes 416. In other embodiments, the electro-optical element may be parallelepipedic or have other suitable shapes. The electro-optical element 408 has an optical axis 410 which is also the optical axis for the electro-optical cell 402, which has first and second opposed optically clear cell apertures 412, 414 defined by the optical axis 410. The term "aperture", as used in this specification, is used herein in its optical sense and hence refers to an optical aperture rather than a physical aperture.

In a preferred embodiment, the electro-optical cell 402 is a Pockels cell, in which case the electro-optical element 408 is an anisotropic, birefringent electro-optical crystal. Suitable materials for the crystal include $KD_2PO_4$ (KD*P), lithium niobate, gallium arsenide and other media such as electric-field poled polymers or glasses. The electro-optical cell 402 may also be a Kerr cell, in which case the electro-optical element 408 may be a suitable crystal, or may be an optically transparent enclosure filled with suitable Kerr liquid.

The electrodes 416 are positioned to pass an electric field through the electro-optical element 408 to control modulation of incoming light passing through the electro-optical element 408 and aligned with the optical axis 410. Where the electro-optical cell 402 is a Pockels cell and the electro-optical element 408 is therefore a birefringent electro-optical crystal, the magnitude of the electric field will affect the amount of birefringence of the electro-optical element 408 for light aligned with the optical axis 410 and thereby control polarization of the light. In the embodiment shown in FIGS. 4A and 4B, the electrodes 416 are positioned so that the electric field passes through the electro-optical element 408 transversely to the optical axis 410; thus, the electro-optical cell 402 is a transverse electro-optical cell 402. The electrodes 416 are embedded in the housing 406, in particular, the electrodes 416 are received in corresponding opposed recesses 418 in the inner surface 420 of the housing 406. In other embodiments, the electrodes may be thin films which are sufficiently thin so as not to require recesses in the housing. As shown schematically in FIG. 4A, the electrodes 416 are electrically coupled to an electrical control system 422 that controls a voltage applied across the electrodes 416.

The lens assembly 404, more particularly the single lens 426, is secured at the first cell aperture 412 in engagement with the electro-optical element 408, and has an optically clear lens aperture 424 in optical alignment with the first cell aperture 412. The lens assembly 404 may be held in contact with the electro-optical element 408 by the housing 406, or may be adhered to the electro-optical element 408 by a suitable optically transparent adhesive.

Figure 5A:
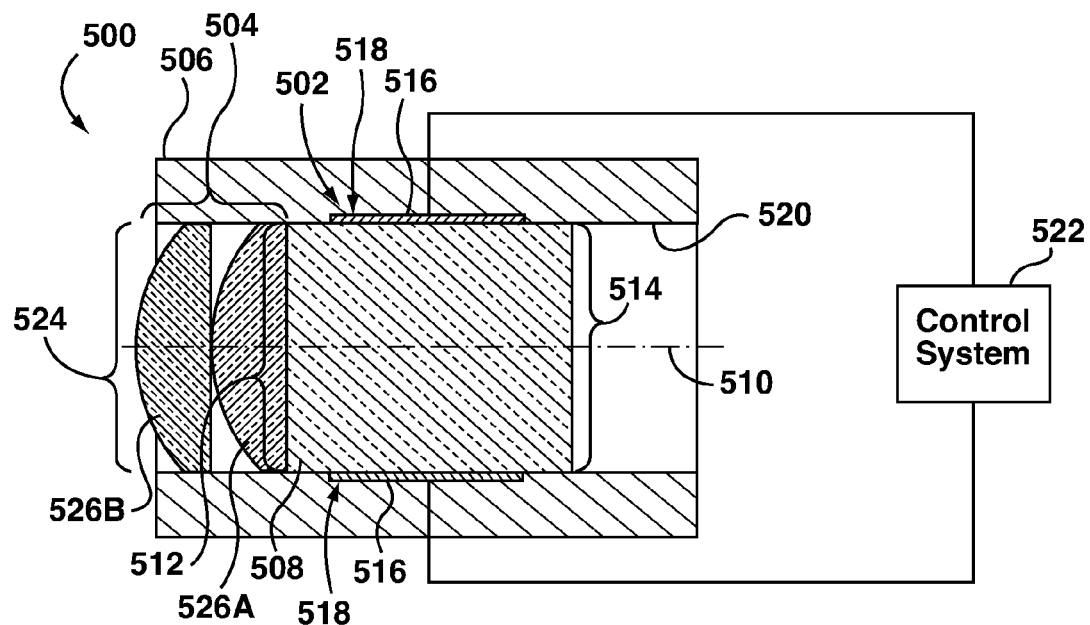
FIG. 5A is a side cross-sectional view of a second exemplary embodiment of an optically powered transverse electro-optical modulator according to an aspect of the present invention.
Figure 5B:
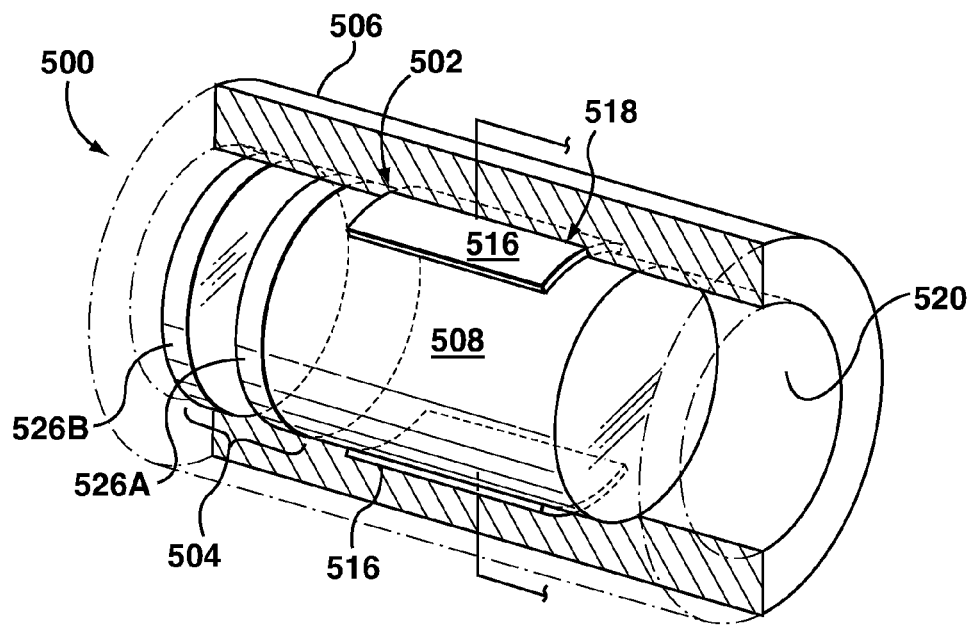
FIG. 5B is a cut-away perspective view of the electro-optical modulator of FIG. 5A.

FIGS. 5A and 5B show an embodiment of an optically powered electro-optical modulator 500 which is identical to the optically powered electro-optical modulator 400 shown in FIGS. 4A and 4B except that the lens assembly 504 comprises two individual lenses 526A, 526B in optical alignment with one another. Accordingly, corresponding reference numerals are used to denote corresponding features, except with the prefix "5" instead of "4".

Figure 6A:
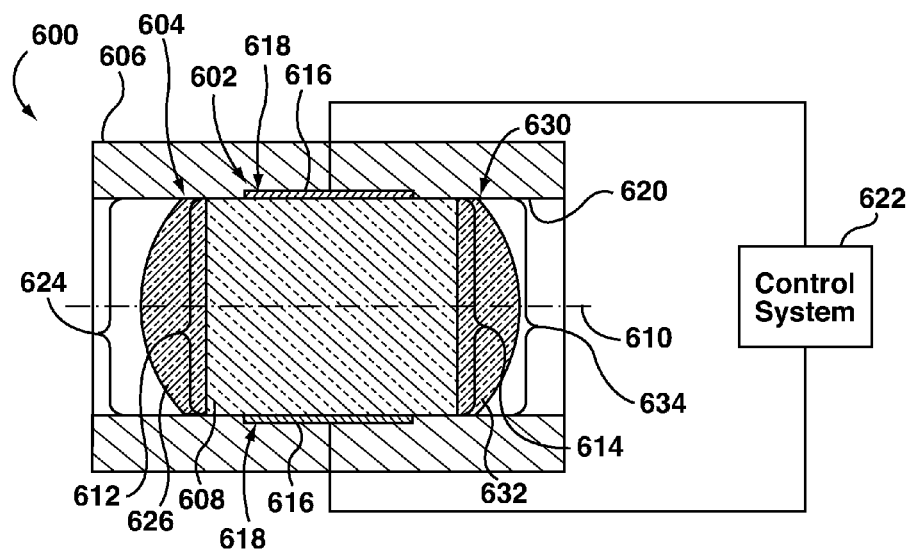
FIG. 6A is a side cross-sectional view of a third exemplary embodiment of an optically powered transverse electro-optical modulator according to an aspect of the present invention.
Figure 6B:
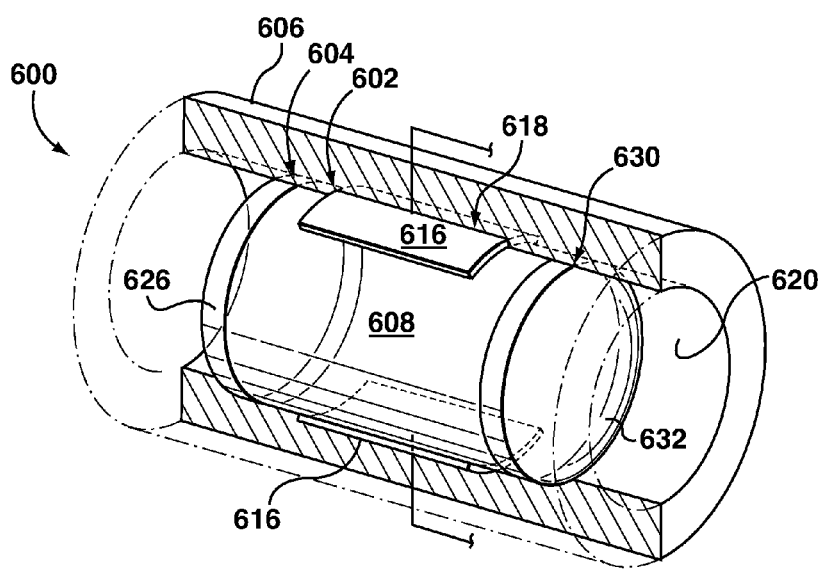
FIG. 6B is a cut-away perspective view of the electro-optical modulator of FIG. 6A.

FIGS. 6A and 6B show an embodiment of an optically powered electro-optical modulator 600 which is substantially identical to the optically powered electro-optical modulator 400 shown in FIGS. 4A and 4B and which also includes an optically powered second lens assembly 630 which, like the first lens assembly 604, comprises a single lens 632 and is carried by the housing 606. Again, corresponding reference numerals are used to denote corresponding features, except with the prefix "6" instead of "4". In the optically powered electro-optical modulator 600 shown in FIGS. 6A and 6B, the second lens assembly 630 is secured at the second cell aperture 614, and has an optically clear second lens aperture 634 in optical alignment with the second cell aperture 614 and with the first lens aperture 624.

Figure 7A:
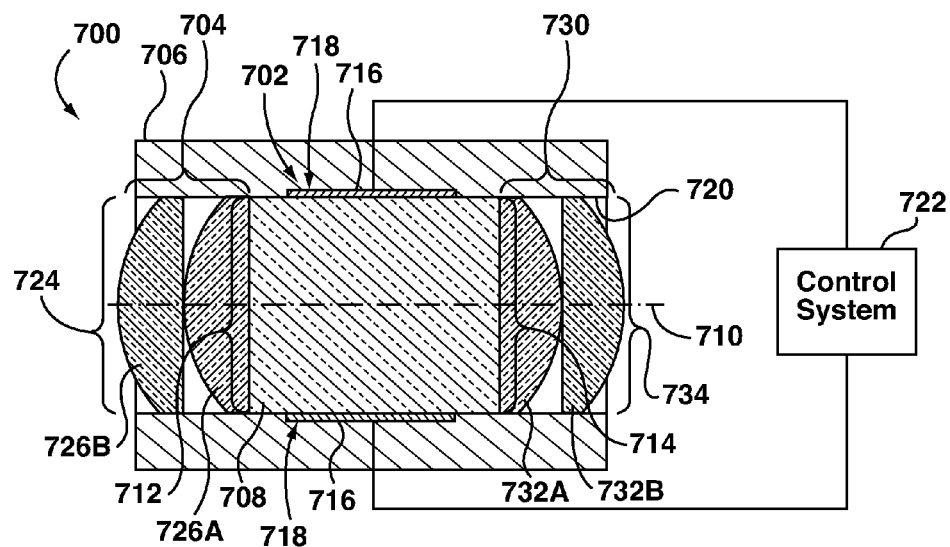
FIG. 7A is a side cross-sectional view of a fourth exemplary embodiment of an optically powered transverse electro-optical modulator according to an aspect of the present invention.
Figure 7B:
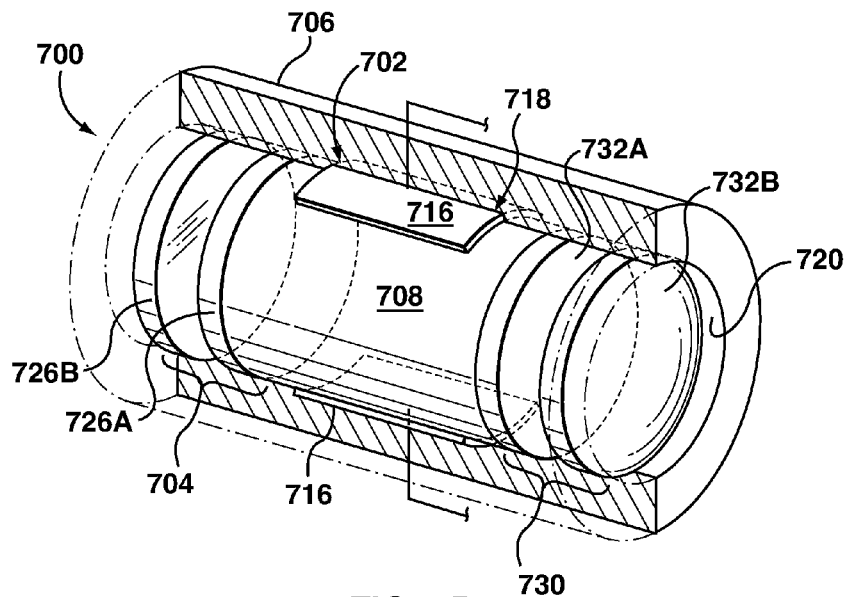
FIG. 7B is a cut-away perspective view of the electro-optical modulator of FIG. 7A.

FIGS. 7A and 7B show an embodiment of an optically powered electro-optical modulator 700 which is identical to the optically powered electro-optical modulator 600 shown in FIGS. 6A and 6B except that the first lens assembly 704 and second lens assembly 730 each comprise, respectively, two individual lenses 726A, 726B and 732A, 732B in optical alignment with one another and have respective optically clear first lens aperture 724 and optically clear second lens aperture 734. Accordingly, corresponding reference numerals are used to denote corresponding features, except with the prefix "7" instead of "6".

Figure 8A:
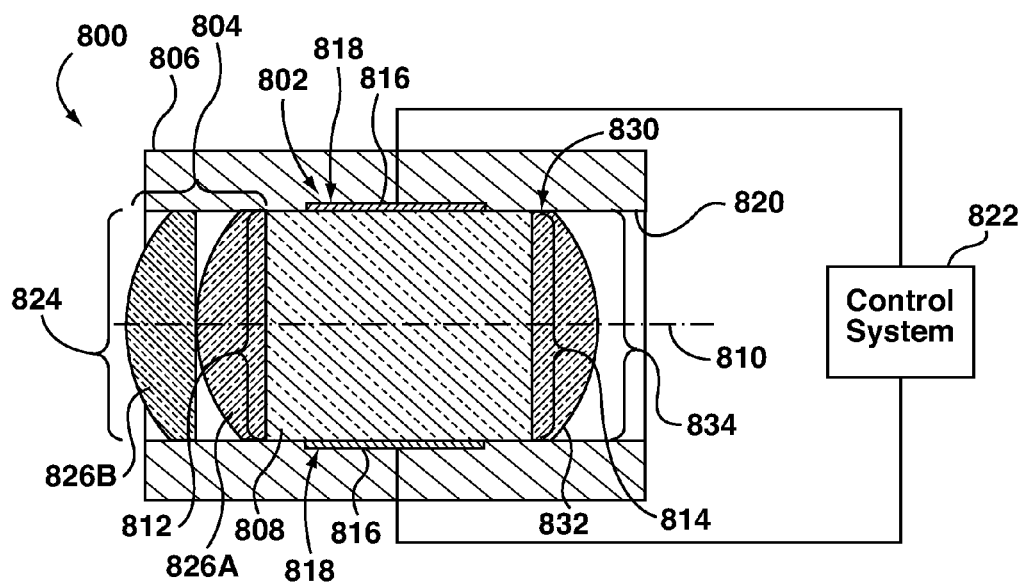
FIG. 8A is a side cross-sectional view of a fifth exemplary embodiment of an optically powered transverse electro-optical modulator according to an aspect of the present invention.
Figure 8B:
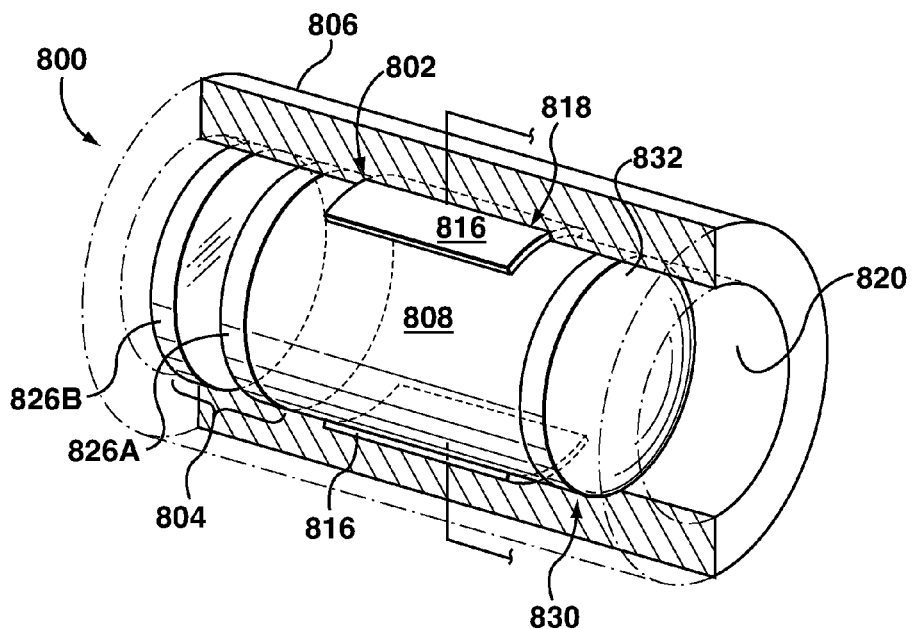
FIG. 8B is a cut-away perspective view of the electro-optical modulator of FIG. 8A.

FIGS. 8A and 8B show an embodiment of an optically powered electro-optical modulator 800 which is substantially identical to the optically powered electro-optical modulator 700 shown in FIGS. 7A and 7B, except that while the first lens assembly 804 comprises two individual lenses 826A, 826B, the optically powered second lens assembly 830 comprises a single lens 832. Again, corresponding reference numerals are used to denote corresponding features, except with the prefix "8" instead of "7".

In the embodiments described above in respect of FIGS. 4A to 8B, the electro-optical cells 402, 502, 602, 702, 802 are transverse electro-optical cells, with the electrodes 416, 516, 616, 716, 816 positioned so that the electric field passes through the respective electro-optical element 408, 508, 608, 708, 808 transversely to the optical axis 410. Aspects of the present invention also contemplate the use of longitudinal electro-optical cells in which the electrodes are positioned so that the electric field passes through the electro-optical element or elements longitudinally along the optical axis.

Figure 9A:
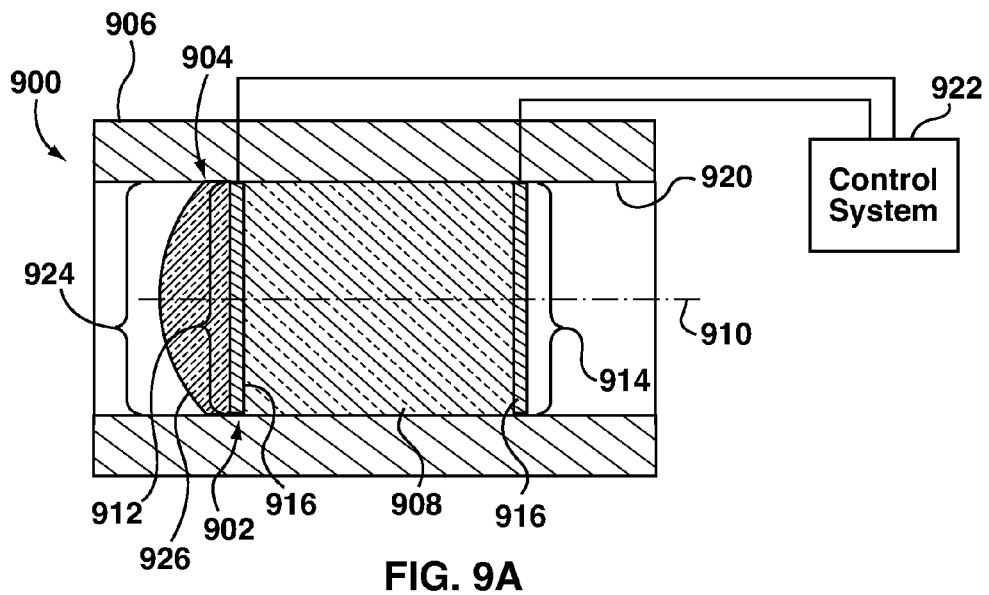
FIG. 9A is a side cross-sectional view of a first exemplary embodiment of an optically powered longitudinal electro-optical modulator according to an aspect of the present invention.
Figure 9B:
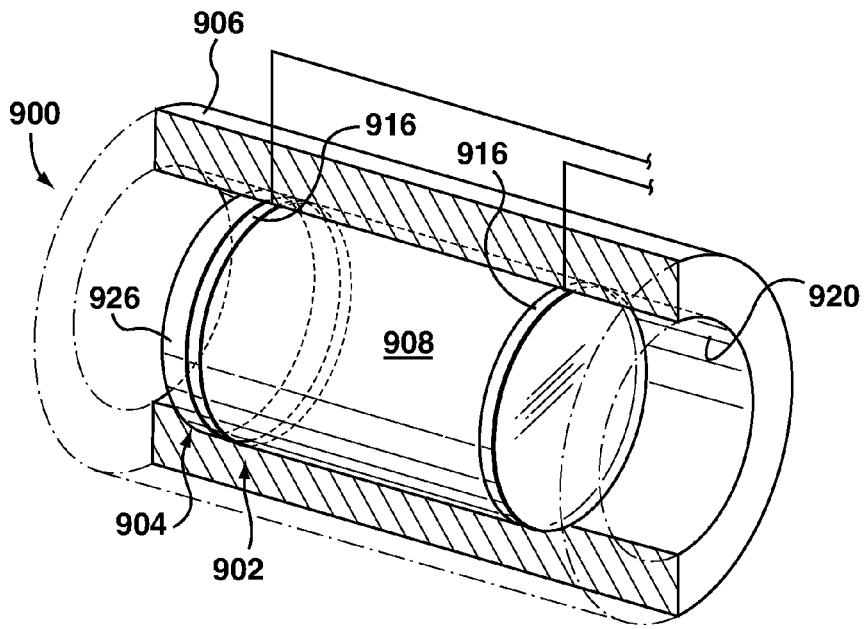
FIG. 9B is a cut-away perspective view of the electro-optical modulator of FIG. 9A.

FIGS. 9A and 9B show an optically powered electro-optical modulator 900 which is substantially identical to the optically powered electro-optical modulator 400 shown in FIGS. 4A and 4B, except that the electro-optical cell 902 of the electro-optical modulator 900 is a longitudinal electro-optical cell 902 rather than a transverse electro-optical cell. As such, corresponding reference numerals are used to denote corresponding features, except with the prefix "9" instead of "4". Because the electro-optical cell 902 is a longitudinal electro-optical cell 902, the electrodes 916 are secured to the opposed ends of the electro-optical element 908 over the cell clear apertures 912, 914 so that the electric field passes through the electro-optical element 908 longitudinally along the optical axis 910. The thickness of the electrodes 916 has been exaggerated significantly in the drawings to facilitate illustration; the electrodes 916 are extremely thin and effectively optically transparent so as to permit light to pass therethrough; typically the electrodes 916 will be formed from a thin, e.g. mono-molecular layer of indium tin oxide to limit adverse optical effects. Alternatively (not shown), ring electrodes may encircle the electro-optical element at either end thereof so as to leave the cell clear apertures 912, 914 unobstructed. As shown schematically in FIG. 9A, the electrodes 916 are electrically coupled to an electrical control system 922.

The lens assembly 904 is secured at the first cell aperture 912 in engagement with the electro-optical element 908, with the lens aperture 924 in optical alignment with the first cell aperture 912. Given the extremely small thickness of the electrodes 916, the lens assembly 904 is considered to be in engagement with the electro-optical element 908 notwithstanding the interposition of the electrode 916, and possibly a transparent adhesive, between them.

As with the optically powered electro-optical modulator 400 shown in FIGS. 4A and 4B, in a preferred embodiment of the optically powered electro-optical modulator 900 shown in FIGS. 9A and 9B the electro-optical cell 902 is a Pockels cell and the electro-optical element 908 is an anisotropic, birefringent electro-optical crystal. Where the electro-optical cell 902 is a solid Kerr cell, the electro-optical element 908 may be a suitable solid crystal. A longitudinal arrangement cannot be used with a liquid Kerr cell, because in a liquid Kerr cell the electrodes must be transverse to the direction of travel of the light because the quadratic electro-optical effect produces variable birefringence only in the plane of the applied field.

Figure 10A:
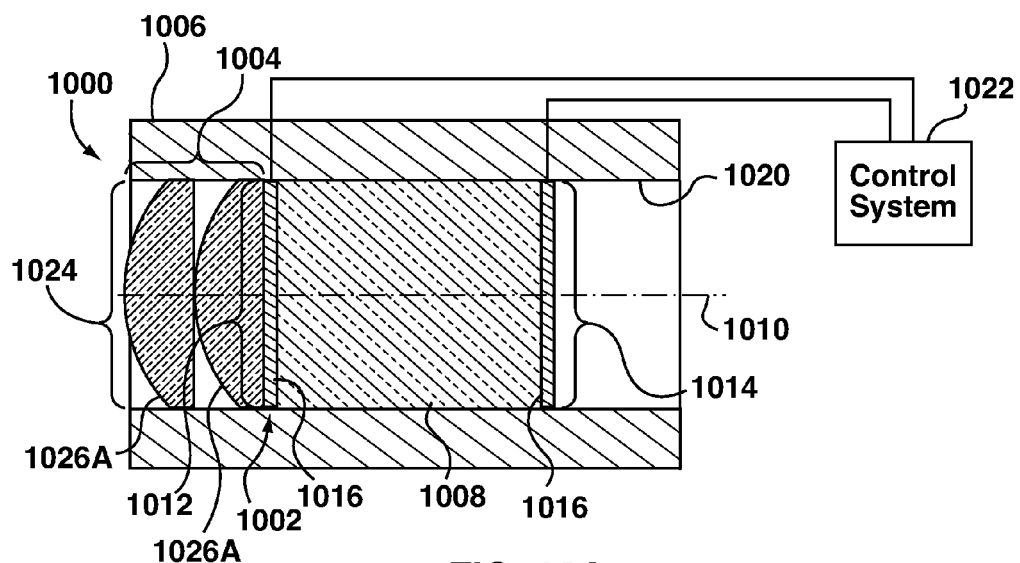
FIG. 10A is a side cross-sectional view of a second exemplary embodiment of an optically powered longitudinal electro-optical modulator according to an aspect of the present invention.
Figure 10B:
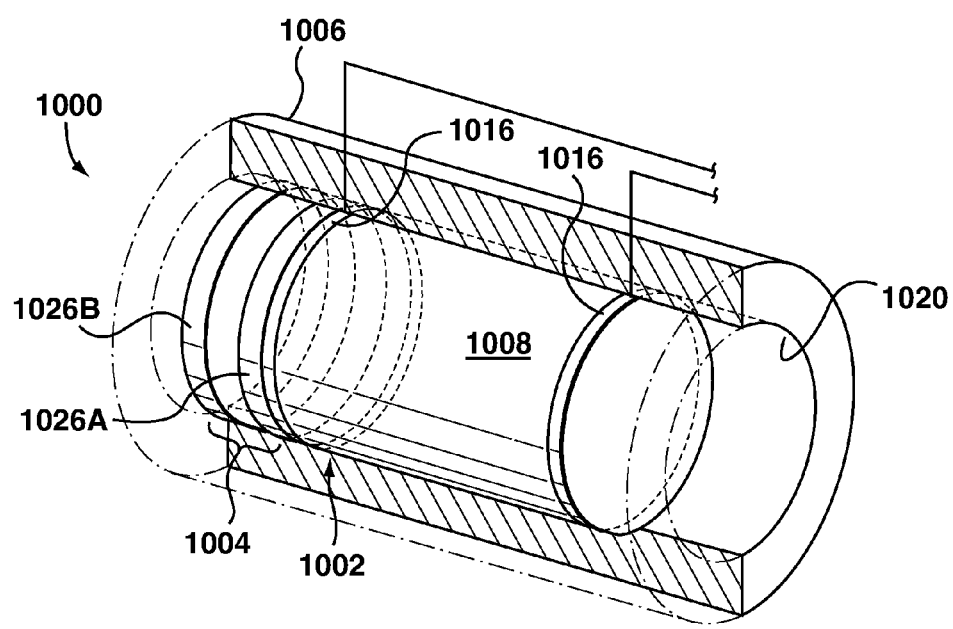
FIG. 10B is a cut-away perspective view of the electro-optical modulator of FIG. 10A.

FIGS. 10A and 10B show an embodiment of an optically powered electro-optical modulator 1000 which is identical to the optically powered electro-optical modulator 900 shown in FIGS. 9A and 9B except that the first lens assembly 1004 comprises two individual lenses 1026A, 1026B in optical alignment with one another. Accordingly, corresponding reference numerals are used to denote corresponding features, except with the prefix "10" instead of "9".

Figure 11A:
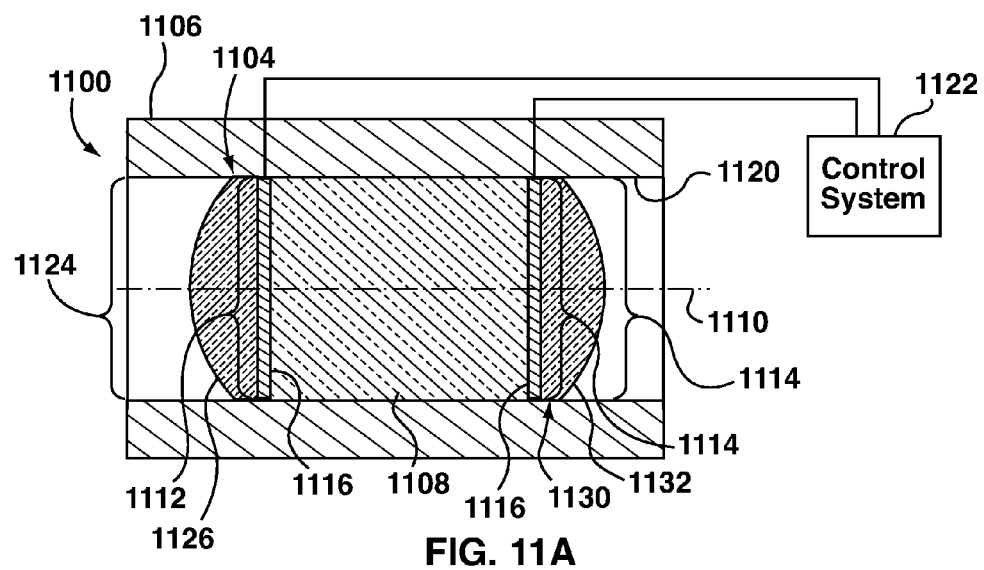
FIG. 11A is a side cross-sectional view of a third exemplary embodiment of an optically powered longitudinal electro-optical modulator according to an aspect of the present invention.
Figure 11B:
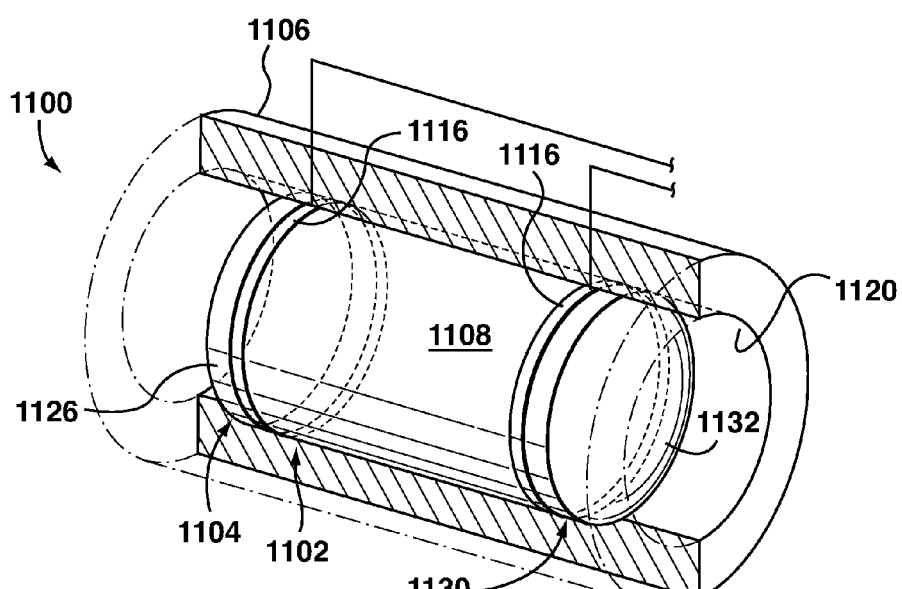
FIG. 11B is a cut-away perspective view of the electro-optical modulator of FIG. 11A.

FIGS. 11A and 11B show an embodiment of an optically powered electro-optical modulator 1100 which is substantially identical to the optically powered electro-optical modulator 900 shown in FIGS. 9A and 9B and which also includes an optically powered second lens assembly 1130 which, like the first lens assembly 1102, comprises a single lens 1132 and is carried by the housing 1106. Again, corresponding reference numerals are used to denote corresponding features, except with the prefix "11" instead of "9". In the optically powered electro-optical modulator 1100 shown in FIGS. 11A and 11B, the second lens assembly 1130 is secured at the second cell aperture 614, and has an optically clear second lens aperture 1134 in optical alignment with the second cell aperture 1114 and with the first lens aperture 1124.

Figure 12A:
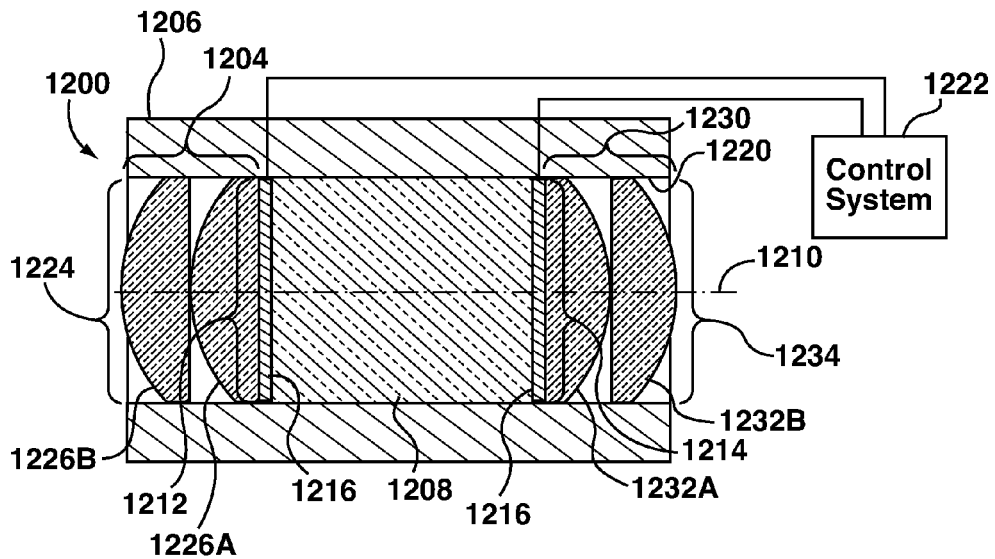
FIG. 12A is a side cross-sectional view of a fourth exemplary embodiment of an optically powered longitudinal electro-optical modulator according to an aspect of the present invention.
Figure 12B:
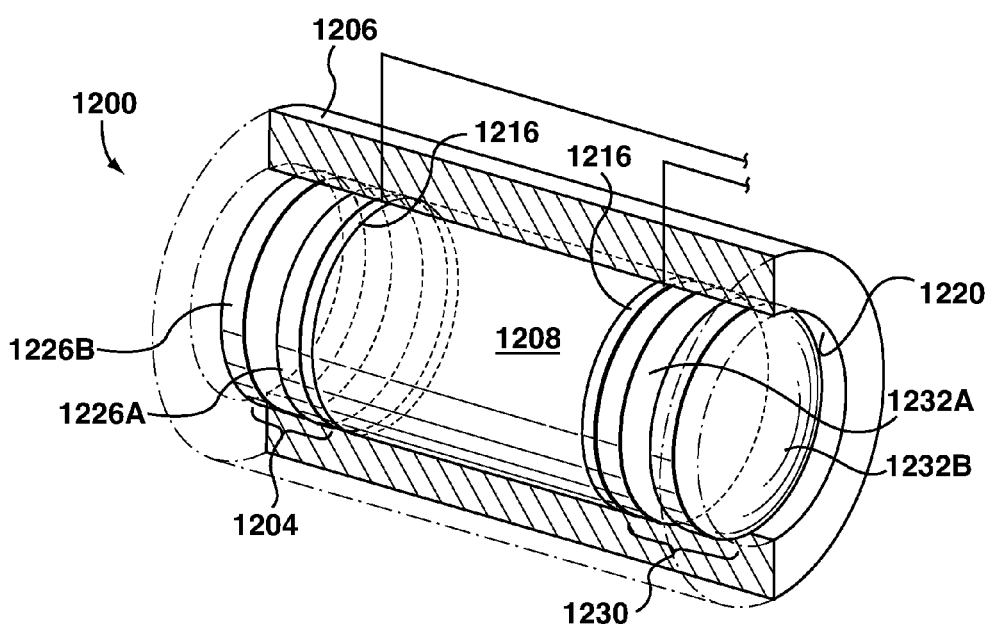
FIG. 12B is a cut-away perspective view of the electro-optical modulator of FIG. 4A.

FIGS. 12A and 12B show an embodiment of an optically powered electro-optical modulator 1200 which is identical to the optically powered electro-optical modulator 1100 shown in FIGS. 11A and 11B except that the first lens assembly 1204 and second lens assembly 1230 each comprise, respectively, two individual lenses 1226A, 1226B and 1232A, 1232B in optical alignment with one another and have respective optically clear first lens aperture 1224 and optically clear second lens aperture 1234. Accordingly, corresponding reference numerals are used to denote corresponding features, except with the prefix "12" instead of "11".

Figure 13A:
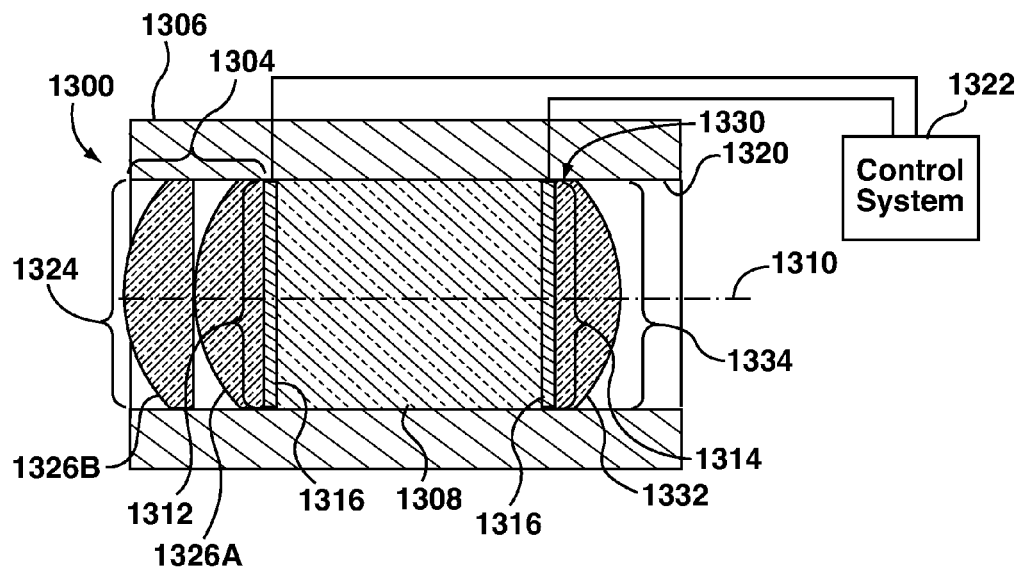
FIG. 13A is a side cross-sectional view of a fifth exemplary embodiment of an optically powered longitudinal electro-optical modulator according to an aspect of the present invention.
Figure 13B:
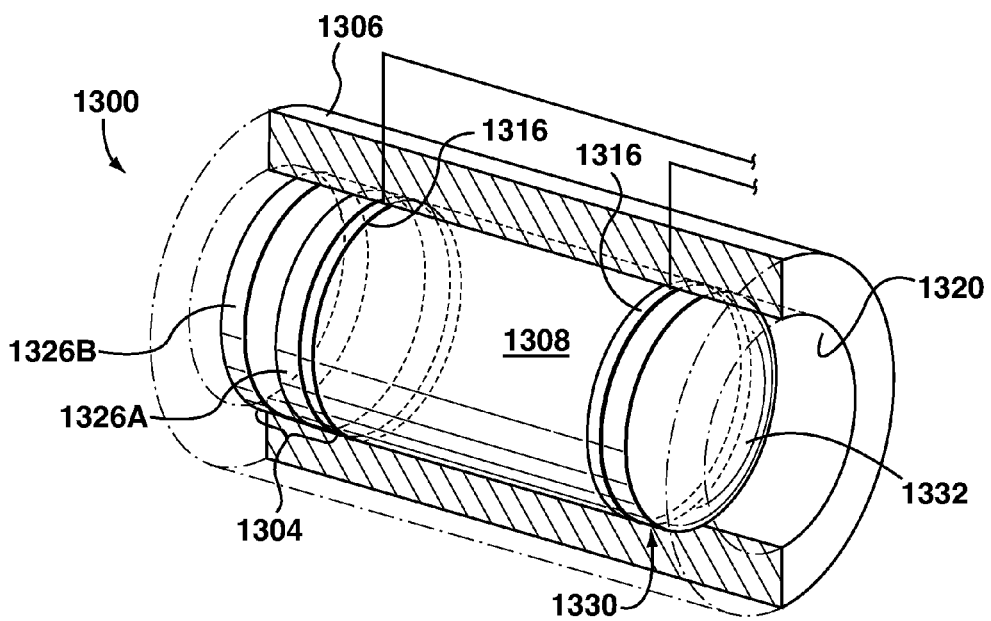
FIG. 13B is a cut-away perspective view of the electro-optical modulator of FIG. 13A.

FIGS. 13A and 13B show an embodiment of an optically powered electro-optical modulator 1300 which is substantially identical to the optically powered electro-optical modulator 1200 shown in FIGS. 12A and 12B, except that while the first lens assembly 1304 comprises two individual lenses 1326A, 1326B, the optically powered second lens assembly 1330 comprises a single lens 1332. Again, corresponding reference numerals are used to denote corresponding features, except with the prefix "13" instead of "12".

In the embodiments described above, the crystal used to form the electro-optical cell has been of monolithic construction. In other embodiments, the electro-optical cell of an optically powered electro-optical modulator according to an aspect of the present invention may comprise a plurality of crystals assembled together with electrodes disposed between each crystal. The change in birefringence due to applied voltage varies inversely with the distance between electrodes. By forming an electro-optical cell from a plurality of thinner crystals with electrodes between each crystal, rather than from a monolithic crystal with a single set of more widely spaced electrodes, the voltage required to achieve a desired level of induced birefringence for a given size of electro-optical cell can be reduced. Examples of such electro-optical cells are described in U.S. Patent Application No. 2010/0128109 A1 in the name of Paul S. Banks, the teachings of which are hereby incorporated by reference in their entirety. A brief summary of an exemplary method for constructing a multi-crystal electro-optical cell is provided below, and the reader is also referred specifically, but without limitation, to paragraphs 114 to 126 and FIGS. 7A to 7C of U.S. Patent Application No. 2010/0128109 A1 noted above.

Figure 14A:
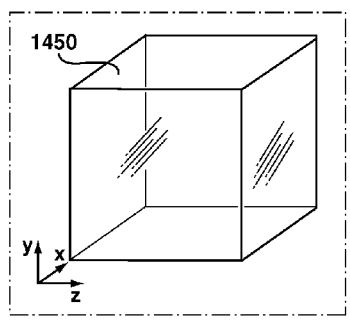
FIG. 14A is a perspective view showing a block of anisotropic, birefringent electro-optical crystal.
Figure 14B:
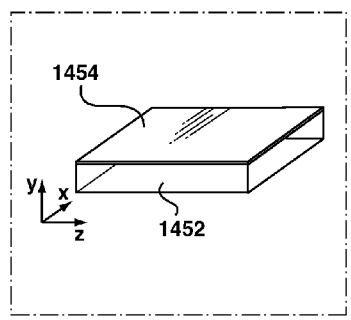
FIG. 14B is a perspective view showing a slice of the crystal of FIG. 14A with a conductive coating applied to an upper surface thereof.

Reference is now made to FIGS. 14A to 14F. FIG. 14A shows a block 1450 of anisotropic, birefringent, electro-optical crystal. The crystal may be, for example, lithium niobate or gallium arsenide. A longitudinal slice 1452 is cut from the block 1450, with the cut being parallel to the longitudinal axis of the crystal. The upper surface of the slice 1452 is then coated with a thin layer of conductive material 1454, as shown in FIG. 14B. The conductive material 1454 may be gold, but is preferably a conductor such as indium tin oxide that is substantially transparent when in a sufficiently thin coating, in order to reduce refraction effects. The thickness of the conductive material 1454 is exaggerated in the drawings, and will typically be extremely thin.

Figure 14C:
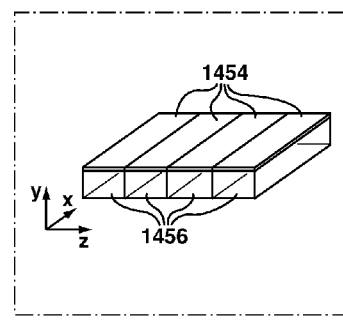
FIG. 14C is a perspective view showing the slice of FIG. 14B cut into strips.
Figure 14D:
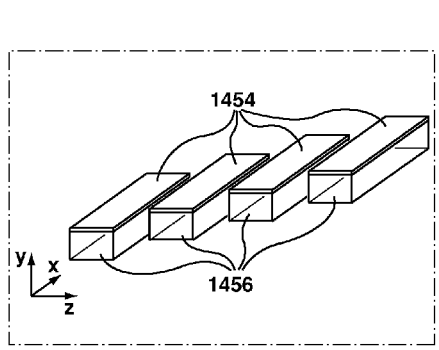
FIG. 14D is a perspective view showing the strips of FIG. 14C separated from one another for vertical stacking.

After the slice 1452 has been coated with the conductive material 1454, it is then cut into strips 1456 of equal width, as shown in FIG. 14C, with each strip 1456 having its own coating of conductive material 1454. The coated strips 1456 are then separated from one another, as shown in FIG. 14D, and assembled into a vertical stack to form a multi-crystal, multi-electrode electro-optical cell 1458 as shown in FIGS. 14E and 14F, with the optical axes of the strips 1456 being parallel to one another.

The coatings of conductive material 1454 act as electrodes, and an additional conductive coating 1460 is applied to the lower surface of the lowermost strip 1456 to form the lowermost electrode. In alternative embodiments (not shown), both the upper and lower surfaces of the slice may receive the conductive coating before the slice is cut into strips. In one such embodiment, when the strips are stacked, the upper and lower conductive coatings of adjacent strips each cooperate to define a single electrode. In other embodiments a thin insulating layer can be disposed between the upper conductive coating and lower conductive coating of adjacent strips, so that each strip has its own dedicated set of electrodes.

Figure 14E:
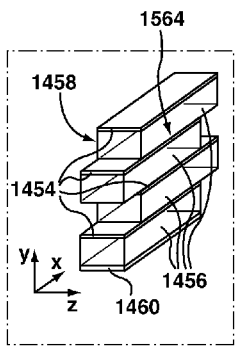
FIG. 14E is a perspective view showing the strips of FIG. 14C assembled into a vertical stack to form a multi-crystal, multi-electrode electro-optical cell.
Figure 14F:
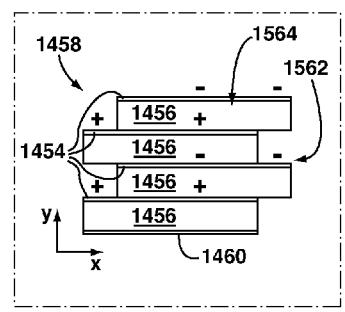
FIG. 14F is a view along the optical axis of the electro-optical element of FIG. 14E.

As shown in FIG. 14E, each strip 1456 is laterally offset from each adjacent strip 1456 in a staggered pattern at the side edges 1562 of the multi-crystal, multi-electrode electro-optical cell 1458 so that electrical connections can be made to each of the coatings of conductive material 1456. At the same time, the strips 1456 are flush with one another along the optical faces 1564 of the multi-crystal electro-optical cell 1458. The smooth optical faces 1564 of the multi-crystal electro-optical cell 1458 will define the cell clear apertures of the multi-crystal electro-optical cell 1458.

Multi-crystal, multi-electrode electro-optical cells 1458 constructed as described above in respect of FIGS. 14A to 14F can be incorporated into optically powered electro-optical components according to an aspect of the present invention.

Figure 15A:
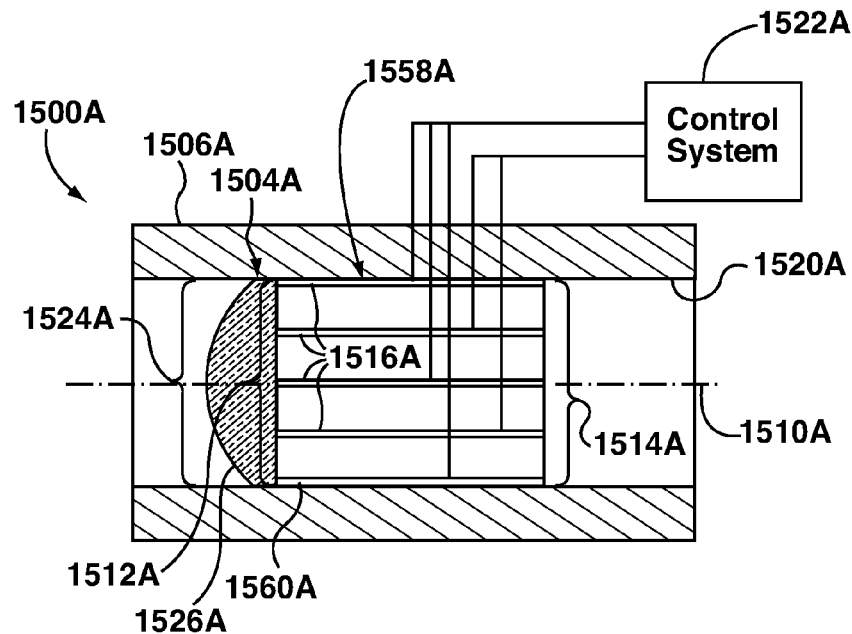
FIG. 15A is a schematic side cross-sectional view of a first exemplary embodiment of an optically powered electro-optical modulator according to an aspect of the present invention incorporating the multi-crystal, multi-electrode electro-optical cell of FIG. 14E.

FIG. 15A shows an optically powered electro-optical modulator 1500A which is substantially identical to the optically powered electro-optical modulator 400 shown in FIGS. 4A and 4B, except that the transverse electro-optical cell 402 has been replaced by a multi-crystal, multi-electrode electro-optical cell 1558A constructed as described above in respect of FIGS. 14A to 14F, and as such the electrodes 1516A are the conductive coatings in the multi-crystal, multi-electrode electro-optical cell 1558A. In a preferred embodiment, the multi-crystal, multi-electrode electro-optical cell 1558A is a Pockels cell. As before, corresponding reference numerals are used to denote corresponding features, except with the prefix "15" instead of "4" and with the additional suffix "A". The electrodes 1516A are electrically coupled to an electrical control system 1522A, with every second electrode 1516A connected in parallel.

Figure 15B:
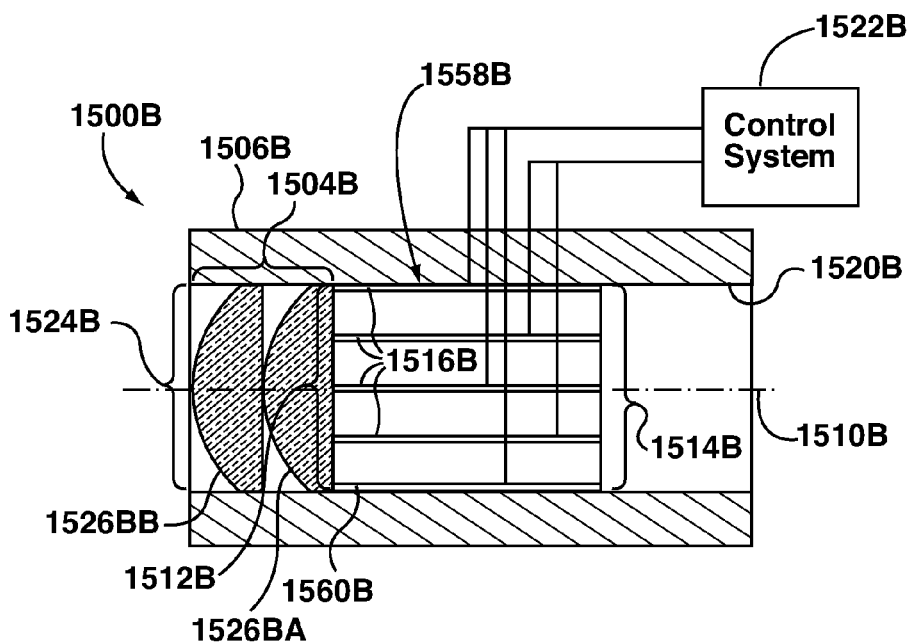
FIG. 15B is a schematic side cross-sectional view of a second exemplary embodiment of an optically powered electro-optical modulator according to an aspect of the present invention incorporating the multi-crystal, multi-electrode electro-optical cell of FIG. 14E.

FIG. 15B shows an embodiment of an optically powered electro-optical modulator 1500B which is identical to the optically powered electro-optical modulator 1500 shown in FIG. 15A except that the first lens assembly 1504B comprises two individual lenses 1526BA, 1526BB in optical alignment with one another, and corresponding reference numerals are used to denote corresponding features, except with the suffix "B" instead of "A".

Figure 15C:
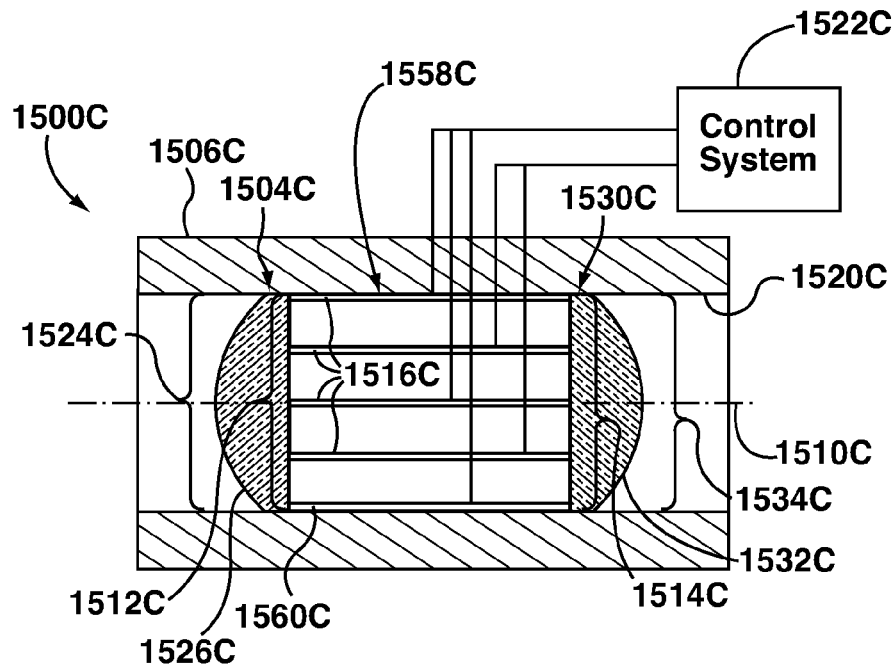
FIG. 15C is a schematic side cross-sectional view of a third exemplary embodiment of an optically powered electro-optical modulator according to an aspect of the present invention incorporating the multi-crystal, multi-electrode electro-optical cell of FIG. 14E.

FIG. 15C shows an embodiment of an optically powered electro-optical modulator 1500C which is substantially identical to the optically powered electro-optical modulator 1500A in FIG. 15A and which also includes an optically powered second lens assembly 1530C carried by the housing 1506C and comprising a single lens 1532C having an optically clear second lens aperture 1534C in optical alignment with the second cell aperture 1514C and with the first lens aperture 1524C. Corresponding reference numerals are used to denote corresponding features, except with the suffix "B" instead of "A".

Figure 15D:
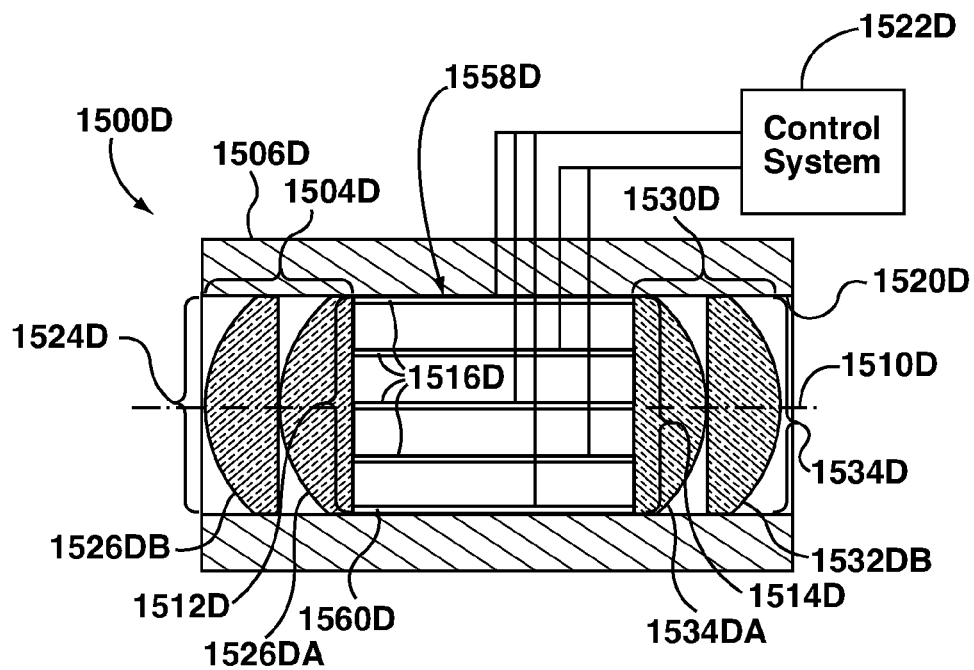
FIG. 15D is a schematic side cross-sectional view of a fourth exemplary embodiment of an optically powered electro-optical modulator according to an aspect of the present invention incorporating the multi-crystal, multi-electrode electro-optical cell of FIG. 14E.

FIG. 15D shows an embodiment of an optically powered electro-optical modulator 1500D which is identical to the optically powered electro-optical modulator 1500C shown in FIG. 15C except that the first lens assembly 1504D and second lens assembly 1530D each comprise, respectively, two individual lenses 1526AD, 1526BD, 1532AD, 1532BD in optical alignment with one another and have respective optically clear first lens aperture 1524D and optically clear second lens aperture 1534D. Accordingly, corresponding reference numerals are used to denote corresponding features, except with the suffix "D" instead of "C".

Figure 15E:
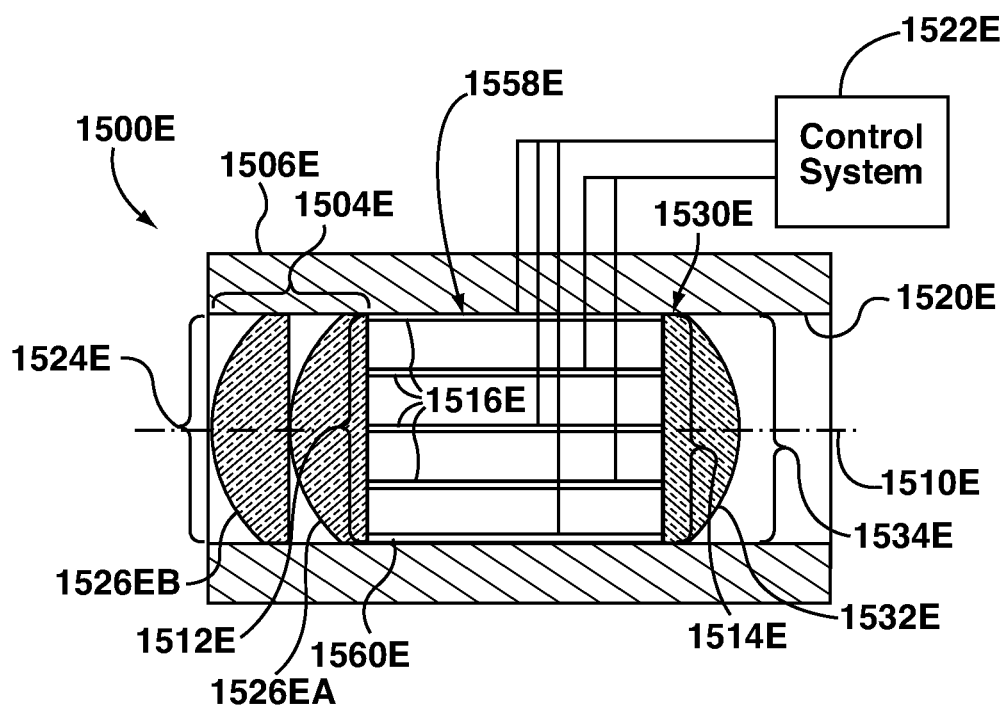
FIG. 15E is a schematic side cross-sectional view of a fifth exemplary embodiment of an optically powered electro-optical modulator according to an aspect of the present invention incorporating multi-crystal, multi-electrode electro-optical cell FIG. 14E.

FIG. 15E shows an embodiment of an optically powered electro-optical modulator 1500E which is substantially identical to the optically powered electro-optical modulator 1500D shown in FIG. 15D, except that while the first lens assembly 1504E comprises two individual lenses 1526AE, 1526BE, the optically powered second lens assembly 1530E comprises a single lens 1532E. Again, corresponding reference numerals are used to denote corresponding features, except with the suffix "E" instead of "D".

In one preferred embodiment, each of the above-described optically powered electro-optical modulators can be configured so that the lens assembly or assemblies will cause the electro-optical modulator to act as a field lens for incoming light whose image region is within the electro-optical modulator.

While the above exemplary embodiments of optically powered optical modulators have used an electro-optical cell as an optical modulation component, aspects of the present invention are applicable to other types of optical modulation components such as acousto-optical components and magneto-optical components. In general, an optically powered optical modulator according to an aspect of the present invention comprises an optical modulation component in combination with one or more optically powered lens assemblies so as to be operable modulate light aligned with the optical axis of the optical modulation component, together with a housing carrying the optical modulation component and the lens assembly or assemblies.

Figure 16A:
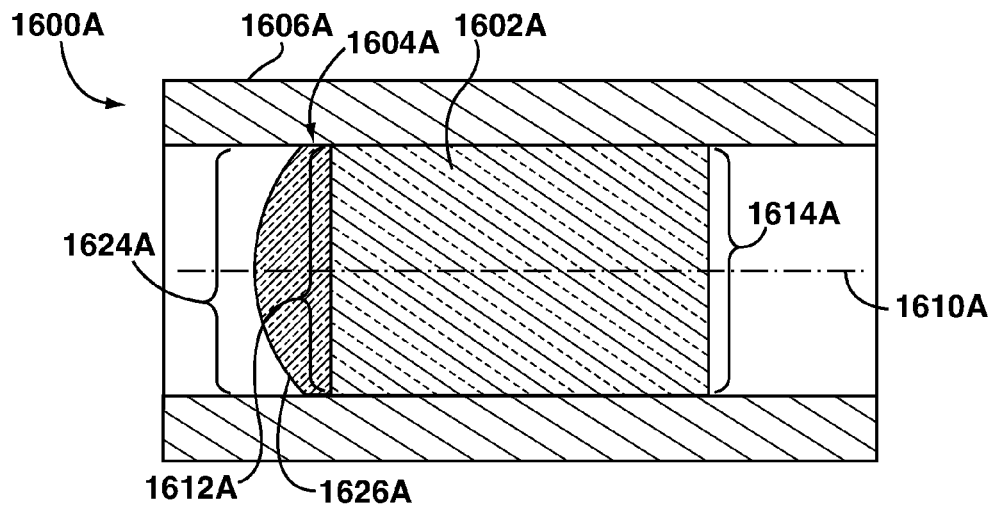
FIG. 16A is a schematic side cross-sectional view of a first exemplary embodiment of a generalized structure for an optically powered optical modulator according to an aspect of the present invention.

FIG. 16A shows an optically powered optical modulator 1600A comprising an optical modulation component 1602A, an optically powered lens assembly 1604A, and a housing 1606A carrying the optical modulation component 1602A and the lens assembly 1604A. In the embodiment shown in FIG. 16A, the optically powered lens assembly 1604A is a single lens 1626A. The optical modulation component 1602A has an optical axis 1610A and first and second opposed optically clear component apertures 1612A, 1614A defined by the optical axis 1610A. The optical modulation component 1602 is operable to modulate light aligned with its optical axis 1610A. The lens 1626A is secured at the first component aperture 1612A, preferably in engagement with the optical modulation component 1602, and has an optically clear lens aperture 1624A in optical alignment with the first component aperture 1612A.

Figure 16B:
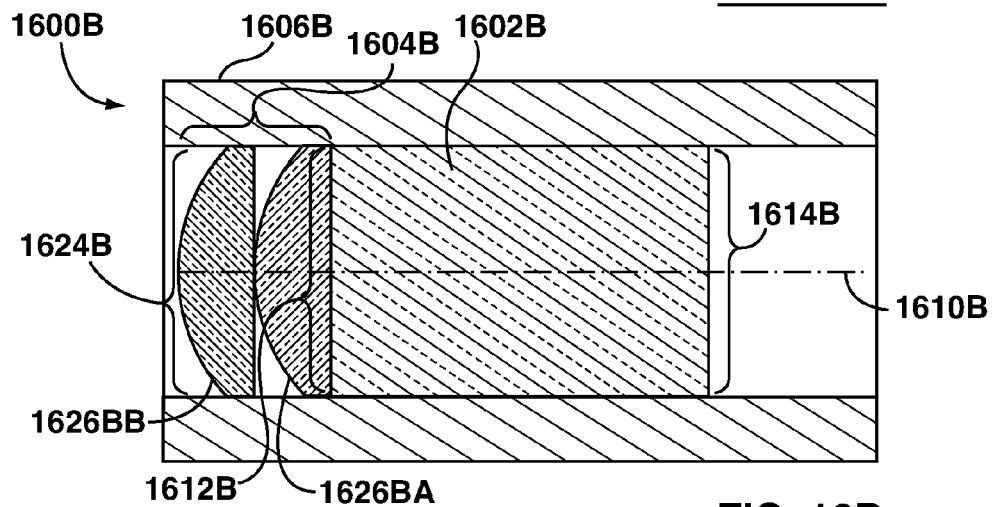
FIG. 16B is a schematic side cross-sectional view of a second exemplary embodiment of a generalized structure for an optically powered optical modulator according to an aspect of the present invention.

FIG. 16B shows an embodiment of an optically powered optical modulator 1600B which is identical to the optically powered optical modulator 1600 shown in FIG. 16A except that the first lens assembly 1604B comprises two individual lenses 1626BA, 1626BB in optical alignment with one another, and corresponding reference numerals are used to denote corresponding features, except with the suffix "B" instead of "A".

Figure 16C:
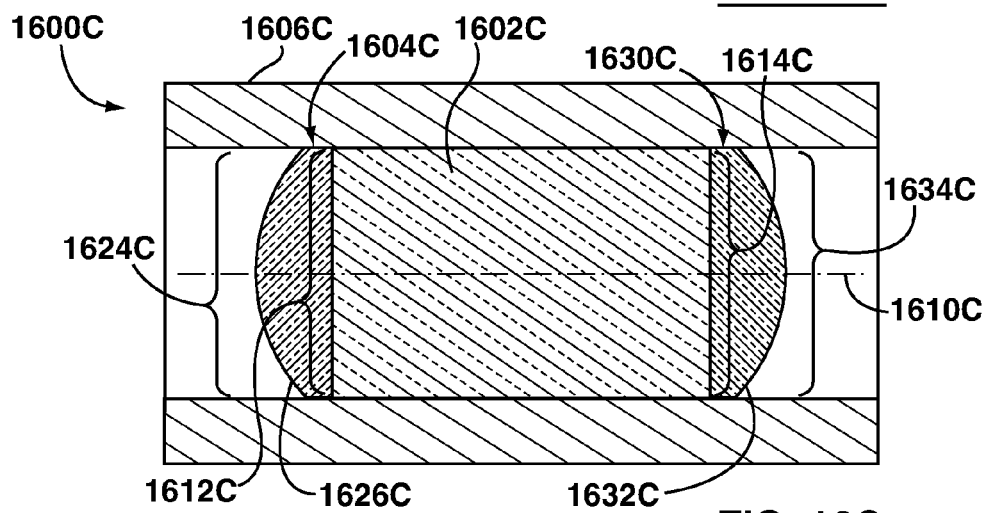
FIG. 16C is a schematic side cross-sectional view of a third exemplary embodiment of a generalized structure for an optically powered optical modulator according to an aspect of the present invention.

FIG. 16C shows an embodiment of an optically powered optical modulator 1600C which is substantially identical to the optically powered optical modulator 1600A in FIG. 16A and which also includes an optically powered second lens assembly 1630C carried by the housing 1606C and comprising a single lens 1632C having an optically clear second lens aperture 1634C in optical alignment with the second component aperture 1614C and with the first lens aperture 1624C. Corresponding reference numerals are used to denote corresponding features, except with the suffix "B" instead of "A".

Figure 16D:
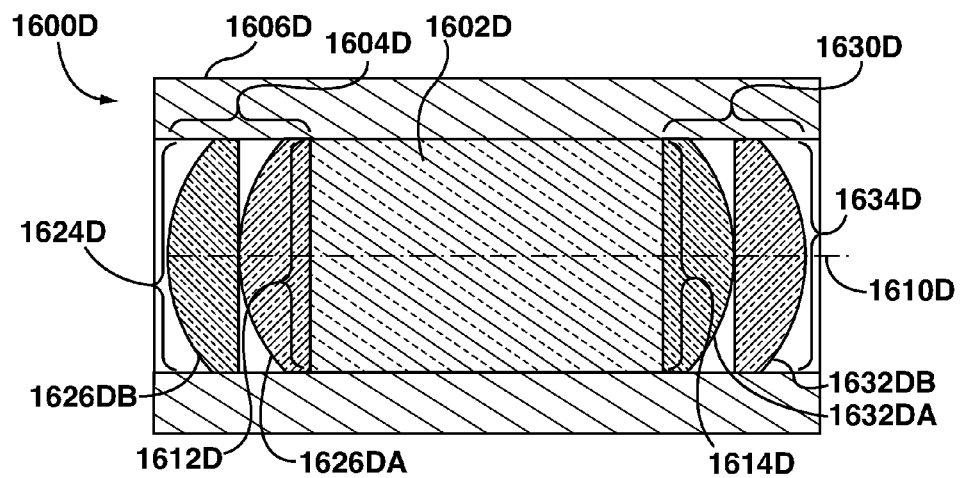
FIG. 16D is a schematic side cross-sectional view of a fourth exemplary embodiment of a generalized structure for an optically powered optical modulator according to an aspect of the present invention.

FIG. 16D shows an embodiment of an optically powered optical modulator 1600D which is identical to the optically powered optical modulator 1600C shown in FIG. 16C except that the first lens assembly 1604D and second lens assembly 1630D each comprise, respectively, two individual lenses 1626AD, 1626BD and 1632AD, 1632BD in optical alignment with one another. The optically clear first lens aperture 1624D and optically clear second lens aperture 1634D are in alignment with the first and second component apertures 1612D, 1614D. Accordingly, corresponding reference numerals are used to denote corresponding features, except with the suffix "D" instead of "C".

Figure 16E:
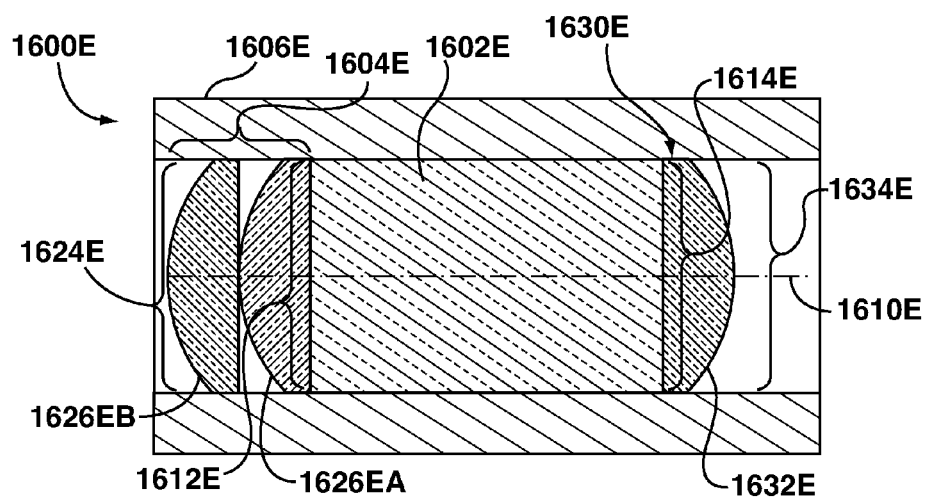
FIG. 16E is a schematic side cross-sectional view of a fifth exemplary embodiment of a generalized structure for an optically powered optical modulator according to an aspect of the present invention.

FIG. 16E shows an embodiment of an optically powered optical modulator 1600E which is substantially identical to the optically powered optical modulator 1600D shown in FIG. 16D, except that while the first lens assembly 1604E comprises two individual lenses 1626AE, 1626BE, the optically powered second lens assembly 1630E comprises a single lens 1632E. Again, corresponding reference numerals are used to denote corresponding features, except with the suffix "E" instead of "D".

In each of the embodiments 1600A, 1600B, 1600C, 1600D and 1600E shown in FIGS. 16A to 16E, respectively, the optical modulation component may be an electro-optical component, such as a Pockels cell or a Kerr cell, an acousto-optical component or a magneto-optical component.

As described above, in the preferred embodiments illustrated herein the lens assembly or assemblies will engage the optical modulation component. In other embodiments, however, there may be an air gap, oil gap or vacuum gap between the optical modulation component and the lens assembly or assemblies as long as the optical modulation component and the lens assembly or assemblies are sufficiently close together that the optical modulator functions as a single optical element.

In addition, although the lenses have been shown as being directly supported by the respective housing for ease of illustration, it is also contemplated that the lenses may be received in an annular mounting which is in turn received by the respective housing.

Various embodiments have been described by way of example. It will be apparent to persons skilled in the art that a number of variations and modifications can be made without departing from the scope of the invention as defined in the claims.

What is claimed is:

1. An optically powered optical modulator, comprising:
   an optical modulation component having an optical axis and first and second opposed optically clear component apertures defined by the optical axis and operable to modulate light aligned with the optical axis;
   an optically powered first lens assembly secured at the first component aperture;
   the first lens assembly having an optically clear first lens aperture in optical alignment with the first component aperture; and
   a housing carrying the optical modulation component and the first lens assembly.

2. The optical modulator of claim 1, wherein the optical modulation component is selected from the group consisting of electro-optical component, acousto-optical component and magneto-optical component.

3. The optical modulator of claim 1, wherein the first lens assembly comprises a single lens.

4. The optical modulator of claim 1, wherein the first lens assembly comprises a plurality of individual lenses secured in optical alignment with one another.

5. The optical modulator of claim 1, further comprising:
   an optically powered second lens assembly secured at the second cell aperture;
   the second lens assembly having an optically clear second lens aperture in optical alignment with the second component aperture and with the first lens aperture;
   wherein the housing carries the second lens assembly.

6. The optical modulator of claim 5, wherein the first lens assembly and the second lens assembly each comprise a single lens.

7. The optical modulator of claim 5, wherein the first lens assembly and the second lens assembly each comprise a plurality of individual lenses secured in optical alignment with one another.

8. The optical modulator of claim 5, wherein the first lens assembly comprises a single lens and the second lens assembly comprises a plurality of individual lenses secured in optical alignment with one another.

* * * * *